United States Patent
Nakano (10) Patent No.: US 6,789,389 B2
(45) Date of Patent: Sep. 14, 2004

(54) PISTON-CYLINDER MECHANISMS AND PRESSURE CONTROL UNITS UTILIZING SUCH PISTON-CYLINDER MECHANISMS

(75) Inventor: Keita Nakano, Aichi-ken (JP)

(73) Assignee: Advics Co., Ltd., Kariya (JP)

( * ) Notice: Subject to any disclaimer, the term of this patent is extended or adjusted under 35 U.S.C. 154(b) by 9 days.

(21) Appl. No.: 10/395,283

(22) Filed: Mar. 25, 2003

(65) Prior Publication Data

US 2003/0178271 A1 Sep. 25, 2003

(30) Foreign Application Priority Data

Mar. 25, 2002 (JP) ........................................ 2002-083755

(51) Int. Cl.[7] ............................................... F15B 15/18
(52) U.S. Cl. .............................. 60/593; 60/581; 91/172
(58) Field of Search .......................... 60/593, 562, 581; 91/172, 173; 417/383

(56) References Cited

U.S. PATENT DOCUMENTS 4,140,351 A * 2/1979 Nogami ....................... 60/593
6,564,578 B1   5/2003 Fischer-Calderon

FOREIGN PATENT DOCUMENTS

| EP | 1 225 111 A1 | 7/2002 |
|----|--------------|--------|
| JP | 2000-177562 A | 6/2000 |
| JP | 2000-326839 A | 11/2000 |
| JP | 2002-220042 A | 8/2002 |

* cited by examiner

Primary Examiner—Edward K. Look
Assistant Examiner—Michael Leslie
(74) Attorney, Agent, or Firm—Burns, Doane, Swecker & Mathis, L.L.P.

(57) ABSTRACT

A piston-cylinder mechanism includes a cylinder (50) that defines a cylindrical bore (51). Two pistons (52, 53) are disposed within the cylindrical bore, so that a first pressure chamber (57), a second pressure chamber (58) and a third pressure chamber (59) are defined within the cylindrical bore. The first pressure chamber and one of the second and third pressure chambers individually receive a supply of a pressurized fluid. The pressurized fluid is delivered individually from the second pressure chamber and the third pressure chamber to respective external devices (16, 17). A valve (60; 160) is arranged between one of the second pressure chamber and the third pressure chamber and the corresponding external device. The valve is operable to open and close when the one of the second pressure chamber and the third pressure chamber is expanded and contracted, respectively, due to the movement of the pistons.

19 Claims, 4 Drawing Sheets

PISTON-CYLINDER MECHANISMS AND PRESSURE CONTROL UNITS UTILIZING SUCH PISTON-CYLINDER MECHANISMS

This application claims priority to Japanese patent application serial number 2002-083755, the contents of which are incorporated herein by reference.

1. Technical Field

The present invention relates to piston-cylinder mechanisms. In particular, the present invention relates to piston-cylinder mechanisms that can be suitably utilized for pressure control units that are configured to control the pressure of a fluid, e.g., a hydraulic fluid, that is supplied from a plurality of sources of pressurized fluid to a plurality of external devices.

2. Description of the Related Art

A pressure control unit is known that is adapted to receive a supply of pressurized fluid from a plurality of sources of pressurized fluid for the purpose of fail safe. For example, each source of pressurized fluid includes a pressure generator and a pressure control valve. The pressure generator may produce a flow of highly pressurized fluid. In another know technique, hydraulic master cylinders are used as the sources of pressurized fluid. The sources of pressurized fluid are connected to external devices, e.g., vehicle wheel brakes, via the pressure control unit. The external devices are divided into a plural number of groups that correspond to the number of the sources of pressurized fluid. The pressure control unit is configured to have hydraulic circuits each connected to each group of the external devices. Therefore, even in case that one or more of the sources of pressurized fluid has failed to supply the pressurized fluid due to any trouble, the remaining source(s) of pressurized fluid still can supply the pressurized fluid to the corresponding group(s) of the external devices.

Nevertheless, there has been a problem that the number of the properly operable external devices will be reduced. For example, if the external devices are wheel brakes, braking forces applied to the wheels may be reduced.

SUMMARY OF THE INVENTION

It is accordingly an object of the present invention to teach improved techniques for reliably supplying pressurized fluid to a plurality of external devices even if any of sources of pressurized fluid has failed to supply the pressurized fluid.

According to one aspect of the present teachings, piston-cylinder mechanisms are taught that has a cylinder and a plurality of pistons. The pistons may be disposed within the cylinder in order to define a plurality of pressure chambers.

A plurality of individual sources of pressurized fluid (e.g., hydraulic pressure generators) and a plurality of individual external devices (e.g., wheel brake devices of vehicles) may be connected to the cylinder.

Each of the pressure chambers may communicate with one of the sources of pressurized fluid and/or one of the external devices that are connected to the cylinder, so that each piston may move in response to difference in pressure between the pressure chambers on both sides of the piston. Therefore, the pressure chambers may have substantially the same pressure with each other.

A valve may be associated with the pressure chamber(s) that communicates both the external device and the source of the pressurized fluid. The valve may open and close in response to the relative movement of the pistons that define the pressure chamber, with which the valve is associated. Preferably, the valve may open and close when the pressure chamber in question is expanded and contracted, respectively. Therefore, even when the source of pressurized fluid communicating with the pressure chamber in question has failed to supply the pressurized fluid for some reason or other, that pressure chamber still can be pressurized to deliver the pressurized fluid to the corresponding external device.

On the other hand, when the source of the pressurized fluid communicating only with the corresponding external device has failed to supply the pressurized fluid for some reason or other, the pressure chamber in question also still can be pressurized due to the relative movement of the pistons that define the pressure chamber in question.

Therefore, even if any of the sources of the pressurized fluid has failed to supply the pressurized fluid, the pressurized fluid can be delivered to all of the external devices as long as any one of the sources of the pressurized fluid properly operates to supply the pressurized fluid.

According to another aspect of the present teachings, pressure control units are taught that may include the piston-cylinder mechanism. The pressure control units also may include a plurality of vehicle wheel brakes and a plurality of hydraulic pressure generators. The wheel brakes may serve as the external devices and the hydraulic pressure generators may serve as the hydraulic fluid supply devices.

Therefore, even when any of the hydraulic pressure generators fail to supply the pressurized fluid to the corresponding pressure chamber(s) due to any troubles, the pressurized hydraulic fluid may be reliably delivered to all of the wheel brakes. In other words, the wheel brakes can reliably apply braking forces to their respective wheels.

BRIEF DESCRIPTION OF THE DRAWINGS

Additional objects, features and advantages of the present invention will be readily understood after reading the following detailed description together with the claims and the accompanying drawings, in which:

DETAILED DESCRIPTION OF THE INVENTION

In one embodiment of the present teachings, piston-cylinder mechanisms may include a single cylinder. The cylinder may have a longitudinal axis and may define a cylindrical bore. Two pistons may be disposed within the cylindrical bore, so that a first pressure chamber, a second pressure chamber and a third pressure chamber may be defined within the cylindrical bore along the longitudinal axis of the cylinder. The first pressure chamber and one of the second and third pressure chambers may individually receive a supply of a pressurized fluid from respective sources of pressurized fluid, e.g., hydraulic pressure generators. The pressurized fluid may be delivered individually from the second pressure chamber and the third pressure chamber to respective external devices, e.g., wheel brake devices.

A valve may be disposed between at least one of the second pressure chamber and the third pressure chamber and the corresponding external device. The valve may be operable to open and close when the one of the second pressure chamber and the third pressure chamber is expanded and contracted, respectively, due to the movement of the pistons.

Therefore, when the pressure of the pressurized fluid supplied to the first pressure chamber is higher than the pressure of the pressurized fluid supplied to at least one of the second pressure chamber and the third pressure chamber, the first piston and the second piston may move to pressurize the second pressure chamber and the third pressure chamber. As a result, the pressurized fluid may be delivered from both the second pressure chamber and the third pressure chamber to their respective external devices. Therefore, even when one of the sources of the pressurized fluid fail to supply the pressurized fluid, all of the external devices may receive the supply of the pressurized fluid as long as the other of the sources of the pressurized fluid properly operates to supply the pressurized fluid.

In another embodiment of the present teachings, the pistons may include a first piston and a second piston. The cylinder bore may have a first end surface and a second end surface that oppose to each other. The first pressure chamber may be defined between the first end surface of the cylinder bore and the first piston. The second pressure chamber may be defined between the first piston and the second piston. The third pressure chamber may be defined between the second piston and the second end surface of the cylinder bore. The first pressure chamber and one of the second pressure chamber and the third pressure chamber may communicate with respective pressurized fluid supply devices. The second pressure chamber and the third pressure chamber may communicate with respective external devices. The valve may be disposed between at least one of the second pressure chamber and the third pressure chamber and the corresponding pressurized fluid supply device.

In another embodiment of the present teachings, the first piston may have a pressure receiving area that is greater than a pressure receiving area of the second piston. Therefore, the stroke of movement of the first piston that is necessary for ensuring a required flow rate of the fluid can be reduced. As a result, the cylinder may have a relatively short length.

In another embodiment of the present teachings, the valve may include a valve member and a biasing member. The valve member may be movable between an open position and a close position for permitting and preventing the communication between at least one of the second pressure chamber and the third pressure chamber and the corresponding pressurized fluid supply device, respectively. The biasing member may bias the valve member in a direction toward the open position.

In another embodiment of the present teachings, the valve member may moves from the open position to the close position as one of the second pressure chamber and the third pressure chamber is contracted.

In another embodiment of the present teachings, the first pressure chamber and the third pressure chamber may communicate with their respective pressurized fluid supply devices. The second pressure chamber and the third pressure chamber may communicate with their respective external devices. The valve may permit and prevent the communication between the third pressure chamber and the corresponding pressurized fluid supply device. Preferably, the valve may be disposed within the third pressure chamber.

In another embodiment of the present teachings, the first pressure chamber and the second pressure chamber may communicate with their respective pressurized fluid supply devices. The second pressure chamber and the third pressure chamber may communicate with their respective external devices. The valve may be arranged and constructed to permit and prevent the communication between the second chamber and the corresponding pressurized fluid supply device. Preferably, the valve may be disposed within the second pressure chamber.

In another embodiment of the present teachings, the second pressure chamber may communicates with the corresponding pressurized fluid supply device via a communication channel defined in the second piston.

In another embodiment of the present teachings, pressure control units may include the piston-cylinder mechanism. The pressure control units also may include a first pressure generator and a second pressure generator that serve as the pressurized fluid supply devices. The first pressure generator may communicates with the first pressure chamber. The second pressure generator may communicate with one of the second pressure chamber and the third pressure chamber via the valve.

Therefore, the pressure control units may be used for various control systems for controlling the pressure of a hydraulic fluid and a gaseous fluid, e.g., air.

In another embodiment of the present teachings, pressure control units may include the piston-cylinder mechanism. The pressure control units also may include a first wheel brake and a second wheel brake that serve as the external devices. In addition, the pressure control units may include a first hydraulic pressure generator and a second hydraulic pressure generator that serve as the pressurized fluid supply devices. The first wheel brake may apply a braking force to a first group of vehicle wheels, e.g., front wheels. The second wheel brake may apply a braking force to a second group of vehicle wheels, e.g., rear wheels. The first hydraulic pressure generator and the second hydraulic pressure generator may generate different hydraulic pressures from each other. The first wheel brake may be actuated by the pressure within the second pressure chamber. The second wheel brake may be actuated by the pressure within the third pressure chamber. The first hydraulic pressure generator may be coupled to the first pressure chamber. The second hydraulic pressure generator may be coupled to one of the second and third pressure chambers via the valve.

Therefore, the pressure control units may be advantageously applied to vehicle brake systems, in which braking forces are applied to wheels in response to an operation force applied to a brake operation device, e.g. a brake pedal.

As a result, the braking forces may be reliably applied to all of the wheels even if one of the first and second pressure generators fail to supply the pressurized fluid, i.e. brake oil.

In another embodiment of the present teachings, the second hydraulic pressure generator may be coupled to a brake operation device, so that the second hydraulic pressure generator generates a hydraulic pressure in response to an operation force applied to the brake operation device. The first hydraulic pressure generator may be coupled to the second hydraulic pressure generator and may be operable to generate a hydraulic pressure that is proportional to the hydraulic pressure generated by the second hydraulic pressure generator.

Each of the additional features and teachings disclosed above and below may be utilized separately or in conjunction with other features and teachings to provide improved piston-cylinder mechanisms and pressure control units and using such piston-cylinder mechanisms and pressure control units. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

A first representative piston-cylinder mechanism will now be described with reference to FIG. 1, which shows a cross sectional view of the piston-cylinder mechanism. The piston-cylinder mechanism may include a cylinder body 50. A cylindrical bore 51 may be defined within the cylinder body 50. A first piston 52 and a second piston 53 may be disposed within the cylindrical bore 51. A first hydraulic chamber 57, a second hydraulic chamber 58 and a third hydraulic chamber 59 may be defined within the cylindrical bore 51 by the first and second pistons 52 and 53 and may be arranged in the longitudinal direction of the cylinder bore 50. More specifically, the first hydraulic chamber 57 may be defined between a first end wall (left end wall as viewed in FIG. 1) of the cylindrical bore 51 and the fist piston 52. The second hydraulic chamber 58 may be defined between the first piston 52 and the second piston 53. The third hydraulic chamber 59 may be defined between the second piston 52 and a second end wall (right end wall as viewed in FIG. 1) of the cylindrical bore 51.

A first seal member 54 may be fitted onto the outer periphery of the first piston 52 and may provide a seal between the first piston 52 and the circumferential wall of the cylindrical bore 51. A second seal member 55 may be fitted onto the outer periphery of the second piston 53 and may provide a seal between the second piston 53 and the circumferential wall of the cylindrical bore 51. The first seal member 54 and the second seal member 55 may slide on the circumferential wall of the cylindrical bore 51 as the first piston 52 and the second piston 53 moves within the cylindrical bore 51, respectively.

A first inlet port 50a and a second inlet port 50b may be defined in the cylinder body 50 and may communicate with the first hydraulic chamber 57 and the third hydraulic chamber 59, respectively. The first inlet port 50a and the second inlet port 50b may be connected to their respective hydraulic fluid supply devices or circuits that have individual hydraulic pressure generators (not shown in FIG. 1). In addition, a first outlet port 50c and a second outlet port 50d may defined in the cylinder body 50 and may communicate with the second hydraulic chamber 58 and the third hydraulic chamber 59, respectively. The first outlet port 50c and the second outlet port 50d may be connected to their respective individual external devices or output circuits (not shown).

A first compression coil spring 56 may be disposed within the second hydraulic chamber 58 and may be interposed between the first piston 52 and the second piston 53 in order to bias the first piston 52 and the second piston 53 in opposite directions away from each other. A valve 60 may be disposed within the third hydraulic chamber 59 and may be operable to open and close in response to the movement of the second piston 53. The valve 60 may include a valve member 62. The valve member 62 may opposes to the second inlet port 50b and may serve to open and close the second inlet port 50b. A second compression coil spring 66 may be disposed within the third hydraulic chamber 59 and may be interposed between a right end surface (as viewed in FIG. 1) of the second piston 53 and a spring seat 68. The spring seat 68 may be disposed within the third hydraulic chamber 59 and may be pressed against the right end surface of the cylindrical bore 51 by the biasing force of the second compression coil spring 66.

The spring seat 68 may be fitted on the right side portion of the valve member 62, such that the biasing force of the second compression coil spring 66 may be applied to the right side portion of the valve member 62 via the spring seat 68. On the other hand, the left end of the valve member 62 may be inserted into the second piston 53, such that the biasing force of the second compression coil spring 62 may be applied to the left end of the valve member 62 via the second piston 53. As a result, the valve member 62 may be held in an open position for opening the second inlet port 50b when no load is applied to the second piston 53.

Figure 1:
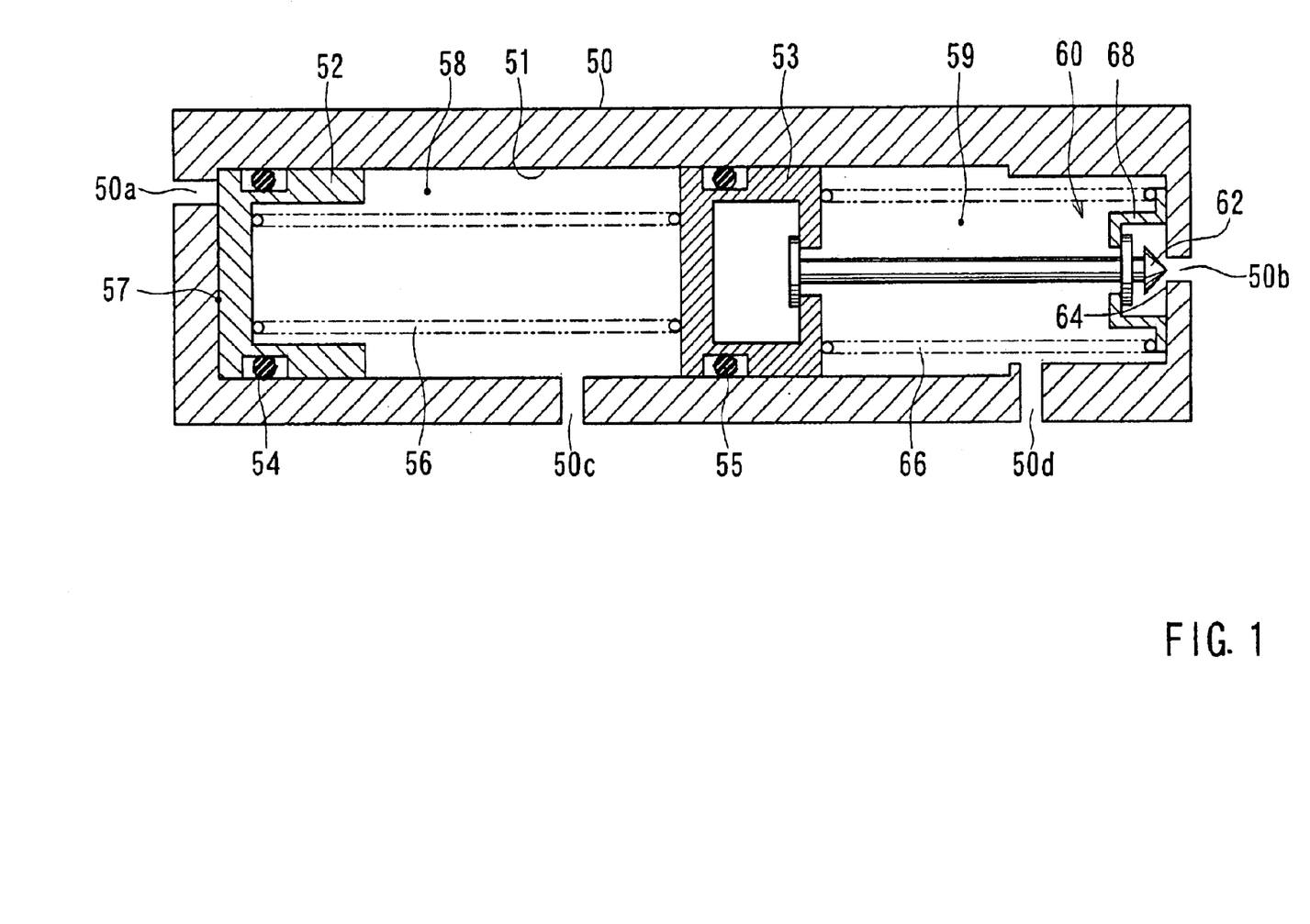
FIG. 1 is a sectional view of a first representative piston-cylinder mechanism.

When a load is applied to the second piston 53 to move the second piston 53 in the right direction as viewed in FIG. 1, the second compression coil spring 66 may be compressed by the second piston 53. Therefore, the biasing force of the second compression coil spring 66 may no longer be applied to the left end of the valve member 62. Then, due to the pressure within the third hydraulic chamber 59, the valve member 62 may move rightward to reach a close position, where the right end (that defines a valve head) of the valve member 62 is pressed against a valve seat 64 so as to close the second inlet port 50b. The valve seat 64 may be defined on the right end surface of the cylindrical bore 51 around the inner periphery of the second inlet port 50b. On the other hand, as the second piston 53 moves leftward, valve member 62 may move leftward away from the close position, so that the second inlet port 50b may be opened.

Therefore, the valve 60 may open when the third hydraulic chamber 59 is expanded by the movement of the second piston 53. On the other hand, the valve 60 may close when the third hydraulic chamber 59 is contracted.

The operation of the first representative piston-cylinder mechanism will now be described. When the pressure of the hydraulic fluid supplied into the first hydraulic chamber 57 via the first inlet port 50a is higher than the pressure of the hydraulic fluid supplied into the third hydraulic chamber 59 via the second inlet port 50b, the first piston 52 may move rightward as viewed in FIG. 1. Then, a hydraulic fluid within the second hydraulic chamber 58 may be pressurized until the pressure within the second hydraulic becomes equal to the pressure within the first hydraulic chamber 57. Subsequently, the second piston 53 may move rightward to close the second inlet port 50b by the valve 60. After the second inlet portion 50b has been closed, the second piston 53 may move further rightward in order to pressurize the hydraulic fluid within the third hydraulic chamber 59 until the pressure within the third hydraulic chamber 59 becomes equal to the pressure within the second hydraulic chamber 58. As a result, the hydraulic fluids that have been pressurized to the same pressure may be delivered to the external output circuits from the second hydraulic chamber 58 via the first outlet port 50c and from the third hydraulic chamber 59 via the second outlet port 50d, respectively.

On the other hand, when the pressure of the hydraulic fluid supplied into the first hydraulic chamber 57 via the first inlet port 50*a* is lower than the pressure of the hydraulic fluid supplied into the third hydraulic chamber 59 via the second inlet port 50*b*, the valve 60 may be held to open due to the pressure of the hydraulic fluid supplied into the third hydraulic chamber 59 via the second inlet port 50*b*. Therefore, the second piston 53 may move leftward as viewed in FIG. 1, so that the hydraulic fluid within the second hydraulic chamber 58 may be pressurized until the pressure within the second hydraulic chamber 58 becomes equal to the pressure within the third hydraulic chamber 57. As a result, the hydraulic fluids that have been pressurized to the same pressure may be delivered to the external output circuits from the second hydraulic chamber 58 via the first outlet port 50*c* and from the third hydraulic chamber 59 via the second outlet port 50*d*, respectively.

In case that the hydraulic fluid within the second hydraulic chamber 58 cannot be pressurized, e.g., due to a trouble caused in the output circuit that is connected to the outlet port 50*c*, the pressurized hydraulic fluid that is supplied into the first hydraulic chamber 57 via the first inlet port 50*a* may urge the first piston 52 to move in the right direction as viewed in FIG. 1, while the first compression coil spring 56 is compressed due to such movement of the first piston 52. Then, the first piston 52 may directly contact the second piston 53 so as to move the second piston 53. Therefore, the hydraulic fluid within the third hydraulic chamber 59 may be pressurized even though the hydraulic fluid within the second hydraulic chamber 58 may not be pressurized. Similarly, in case that the hydraulic fluid within the third hydraulic chamber 59 cannot be pressurized, e.g., due to a trouble caused in the output circuit, the pressurized hydraulic fluid that is supplied into the first hydraulic chamber 57 may urge the first piston 52 to move in the right direction as viewed in FIG. 1, so that the hydraulic fluid within the second hydraulic chamber 58 can be pressurized. These operations are enabled by the arrange of the second hydraulic chamber 58 and the third hydraulic chamber that are separated by the second piston 53.

Therefore, the external devices (output circuits) may be operated automatically and selectively by the pressurized fluid from one of the hydraulic fluid supply devices or the pressurized fluid that has a pressure equal to the pressure of one of the hydraulic fluid supply devices. The pressure of one of the hydraulic fluid supply devices in question is higher than the pressure of the pressurized fluid of the other of the hydraulic fluid supply devices. If the piston-cylinder mechanism is configured to have three or more pistons to define four or more pressure chambers and three or more hydraulic supply devices are connected to the corresponding pressure chambers, the pressure of one of the hydraulic fluid supply devices in question may be the highest among the pressures of the pressurized fluid of the other hydraulic fluid supply devices. These advantages also may be applied to second to fourth representative piston-cylinder mechanisms that will be hereinafter described.

Figure 2:
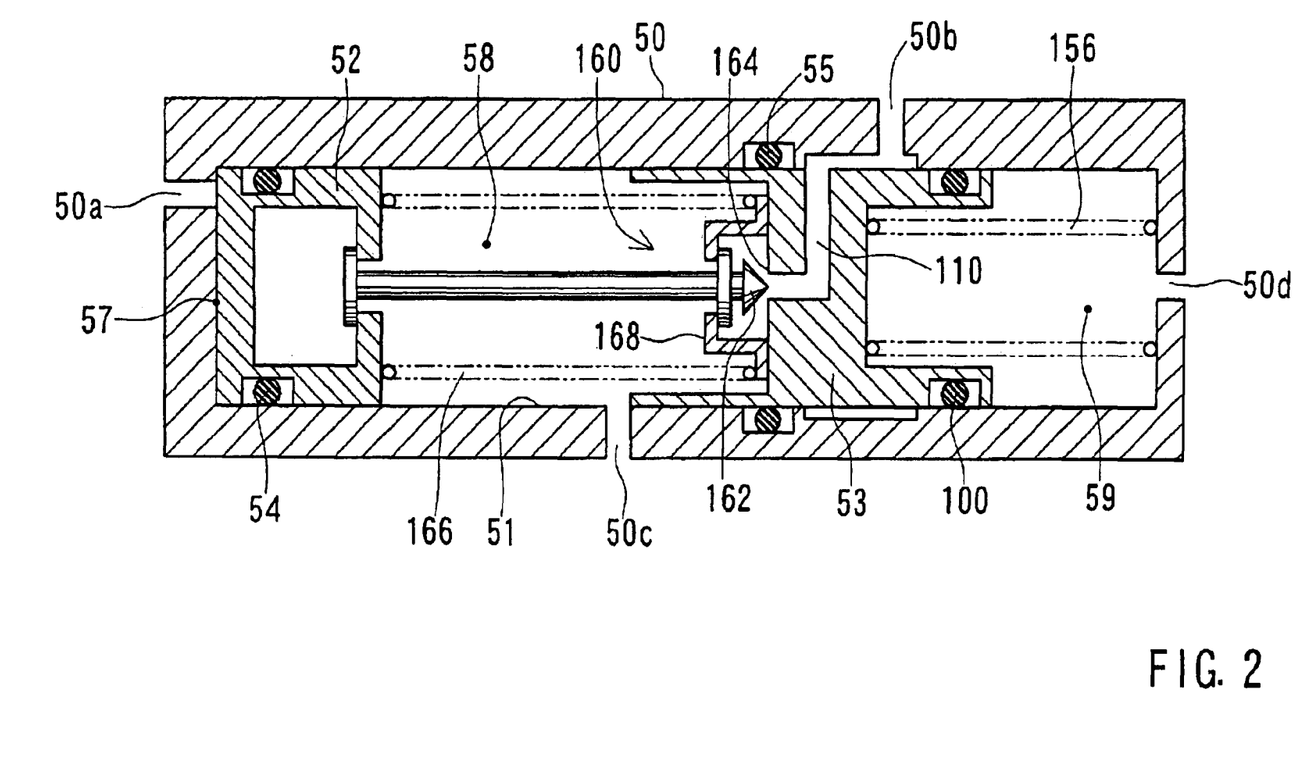
FIG. 2 is a sectional view of a second representative piston-cylinder mechanism.
Figure 3:
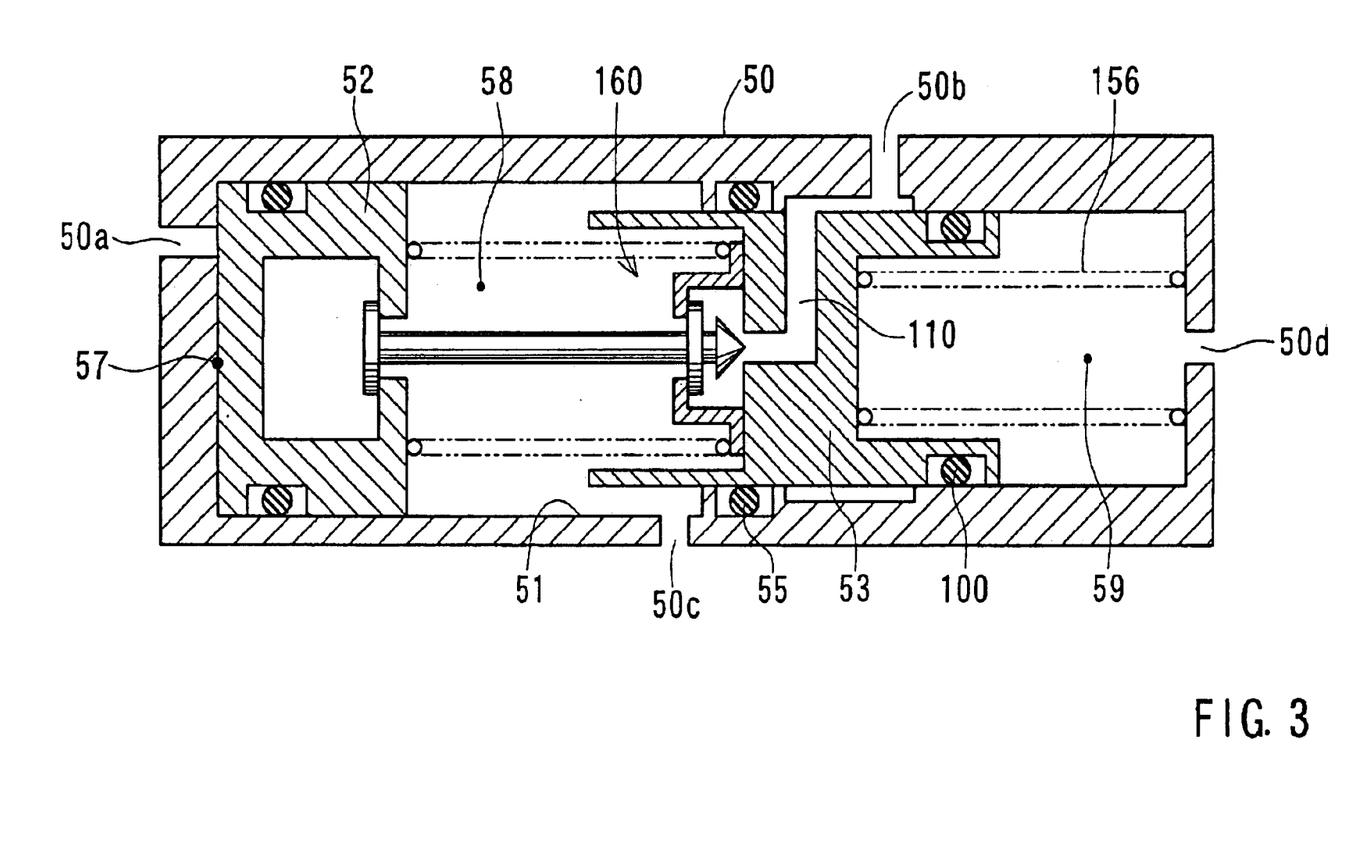
FIG. 3 is a sectional view of a third representative piston-cylinder mechanism.

The second and third representative piston-cylinder mechanisms will now be described with reference to FIGS. 2 and 3, respectively. In FIGS. 2 and 3, like members are given the same reference numerals as the first representative embodiment and an explanation of these members will not be necessary.

Referring to FIG. 2, the second representative piston-cylinder mechanism may include a channel 110 that is defined within the second piston 53. The second inlet port 50*b* may open on the upper side of the cylinder body 50 and may communicate with the second hydraulic chamber 58 via the channel 110. A valve 160 may be disposed within the second hydraulic chamber 58 and may open and close in response to the movement of the first piston 52. A second compression coil spring 156 may be disposed within the third hydraulic chamber 59 and may bias the second piston 53 in a direction toward the second hydraulic chamber 58 (leftward direction as viewed in FIG. 2). In addition to the second seal member 55, a third seal member 100 may be fitted onto the second piston 53, so that the seal may be provided between the outer periphery of the second piston 53 and the circumferential wall of the cylindrical bore 51 on both sides of a communicating path between the second inlet port 50*b* and the channel 110.

The valve 160 may include a valve member 162 that is adapted to open and close an opening of the channel 110 on the side of the second hydraulic chamber 58. A first compression coil spring 166 may be interposed between the right end of the first piston 52 and a spring seat 168 that contacts the left end of the second piston 53, so that the first compression coil spring 166 may bias the valve member 162 in a direction toward an open position (a position away from the opening of the channel 110). When the first piston 52 moves in the right direction as viewed in FIG. 2, the valve member 162 may closely contact a valve seat 164 around the opening of the channel 110, so that the channel 110 may be closed. On the other hand, when the first piston 52 is in a left stroke end as viewed in FIG. 2 or when the second piston 53 moves rightward away from the first piston 52 that is positioned in the left stroke end, the valve member 162 may be positioned away from the valve seat 64 so as to open the opening of the channel 110.

Therefore, the valve 160 may open when the second hydraulic chamber 58 is expanded from an initial volume shown in FIG. 2 due to the movement of the first piston 52 and the second piston 53 relative to each other. On the other hand, the valve 160 may close when the third hydraulic chamber 58 is contracted from the initial volume.

According to the second representative piston-cylinder mechanism, in the same manner as the first representative piston-cylinder mechanism, when the pressure of the hydraulic fluid supplied into the first hydraulic chamber 57 via the first inlet port 50*a* is greater than the pressure of the hydraulic fluid supplied into the third hydraulic chamber 59 via the second inlet port 50*b*, the first piston 52 may move rightward as viewed in FIG. 2. Then, the valve 160 may close in response to the movement of the first piston 52. The first piston may further move rightward, so that the hydraulic fluid within the second hydraulic chamber 58 may be pressurized until the pressure of the hydraulic fluid within the second hydraulic chamber 58 becomes equal to the pressure of the pressurized fluid that is supplied into the first hydraulic chamber 57. At the same time, the second piston 53 may move rightward as viewed in FIG. 2, while the second compression coil spring 156 may be compressed, due to the increased pressure of the hydraulic fluid within the second hydraulic chamber 58. As a result, the hydraulic fluid within the third hydraulic chamber 59 may be pressurized until the pressure of the hydraulic fluid within the third hydraulic chamber 59 becomes equal to the pressure of the hydraulic fluid within the second hydraulic chamber 58. As a result, the hydraulic fluids that have been pressurized to the same pressure may be delivered to the external output circuits from the second hydraulic chamber 58 via the first outlet port 50*c* and from the third hydraulic chamber 59 via the second outlet port 50*d*, respectively.

On the other hand, when the pressure of the hydraulic fluid supplied into the first hydraulic chamber 57 via the first inlet port 50*a* is less than the pressure of the hydraulic fluid supplied into the second hydraulic chamber 58 via the second inlet port 50b, the valve 160 may be held to open to permit the flow of the pressurized hydraulic fluid from the second inlet port 50b to the second hydraulic chamber 58 via the channel 110. Then, the second piston 53 may move rightward as viewed in FIG. 2, while the second compression coil spring 156 may be compressed, due to the pressure of the hydraulic fluid that enters the second hydraulic fluid 58. Therefore, the hydraulic fluid within the third hydraulic chamber 59 may be pressurized until the pressure of the hydraulic fluid within the third hydraulic chamber 59 becomes equal to the pressure within the second hydraulic chamber 58. As a result, the hydraulic fluids that have been pressurized to the same pressure may be delivered to the external output circuits from the second hydraulic chamber 58 via the first outlet port 50c and from the third hydraulic chamber 59 via the second outlet port 50d, respectively.

In this second representative piston-cylinder mechanism, the valve 160 including the valve member 162, the first compression coil spring 166 and the spring seat 168 may not move together with the second piston 53 but may be retained by the first piston 52 when the second piston 53 moves away from the first piston 52 due to the pressure within the second hydraulic chamber 58.

According to the second representative piston-cylinder mechanism, in the same manner as the first representative piston-cylinder mechanism, the third hydraulic chamber 59 may still be pressurized even if the second hydraulic chamber 58 may not be pressurized due to any trouble. Also, the second hydraulic chamber 58 may still be pressurized even if the third hydraulic chamber 59 may not be pressurized due to any trouble.

The third representative piston-cylinder mechanism will now be described with reference to FIG. 3.

The third representative piston-cylinder mechanism may be different from the second representative piston-cylinder mechanism only in that the cylindrical bore 51 has a first portion 51a and a second portion 51b that has a diameter smaller than the diameter of the first portion 51a. The first portion 51a may be adapted to receive the first piston 52 and the second portion 51b may be adapted to receive the second piston 53. Therefore, the pressure receiving area of the first piston 52 is greater than the pressure receiving area of the second piston 53.

According to this arrangement, the stroke of the first piston 52 that is required for pressurizing the second hydraulic chamber 58 may be smaller than the stroke required in the first representative piston-cylinder mechanism, in order to obtain the same flow rate of the hydraulic fluid that flows out of the second hydraulic chamber 58 via the first outlet port 50c (or the hydraulic fluid that flows out of the third hydraulic chamber 59 via the second outlet port 50d). As a result, the entire length in the axial direction of the cylindrical bore 51 may be reduced.

In addition, in case that the second hydraulic chamber 58 may not be pressurized due to any trouble, in the same manner as described in connection with the first representative piston-cylinder mechanism, the first piston 57 may be moved by the pressure of the hydraulic fluid supplied into the first hydraulic chamber 57. The first piston 57 may then contact the second piston 53 so as to directly move the second piston 53. During this operation, due to the difference in the pressure receiving area between the first piston 52 and the second piston 53, the pressure of the hydraulic fluid within the third hydraulic chamber 59 becomes greater than the pressure of the hydraulic fluid within the first hydraulic chamber 57. In other words, the third hydraulic chamber 59 may produce a pressure that is greater than the pressure of the hydraulic fluid that is supplied into the first hydraulic chamber 57. As a result, a reliability of the piston-cylinder mechanism may be improved.

A representative vehicle brake system will now be described with reference to FIG. 4. The representative vehicle brake system may serve as a pressure control unit and may include the fourth representative piston-cylinder mechanism that is a modification of the second representative piston-cylinder mechanism. Therefore, in FIG. 4, like members are given the same reference numerals as the second representative piston-cylinder mechanism.

The fourth representative piston-cylinder mechanism may be different from the second representative-cylinder mechanism in that an additional valve 260 may be disposed within the third hydraulic chamber 59 in order to open and close an inlet/outlet port 200 in response to the movement of the second piston 53. The inlet/outlet port 200 may be defined in the right end wall of the cylinder body 50. The valve 260 may be similar to the valve 60 of the first representative piston-cylinder mechanism and may include a valve member 262, a compression coil spring 266 and a spring seat 268 that correspond to the valve member 62, the compression coil spring 66 and the spring seat 68. The valve member 262 may serve to closely contact a valve seat 268 defined around the inlet/outlet port 200. Therefore, the valve 60 may operate in the same manner as the valve 60 of the first representative piston-cylinder mechanism.

The representative vehicle brake system may further include a hydraulic fluid control device 10 that has a proportional pressure control valve 20 and a pressure generator 30 that are integrated with each other. The pressure generator 30 may be coupled to a brake pedal 14 and may produce a hydraulic pressure in response to the operation of the brake pedal 14.

The hydraulic fluid control device 10 may be configured such that the pressure of a hydraulic fluid (i.e., brake oil) supplied from a pressure source 12 may be increased by the control valve 20 in proportion to the force applied onto the brake pedal 14. The pressure source 12 may include a pump 12a and a pressure accumulator 12b. The pump 12a may be driven by a motor M.

The control device 10 may have a body 21 and the proportional pressure control valve 20 may include a valve spool 22, a return spring 23 and a pin 24 that are disposed within the body 21. The pin 24 may serve to provide a different in area between opposing pressure receiving surfaces defined on the valve spool 22. The hydraulic fluid may be supplied from the pressure source 12 to an inlet port 12a defined in the body 21 and may then apply pressure to the pressure receiving surfaces of the valve spool 22 so as to produce opposing thrust forces. The pressure generator 30 may have a first piston 31, a second piston 32, a first spring 32 and a second spring 34 and may apply a leftward thrust force as viewed in FIG. 4 to the valve spool 22 when the brake pedal 14 is operated. Therefore, the valve spool 22 may be shifted to a position where the thrust forces applied to the pressure receiving surfaces, the biasing force of the return spring 23 and the thrust force applied by the pressure generator 30 are balanced. In response to the shift position of the valve spool 20, an outlet port 21b defined in the body 21 may be connected to and disconnected from the input port 21a and an inlet/outlet port 21c that is also defined in the body 21. In addition, the sectional area of the communication path between the outlet port 21b and the input port 21a or the inlet/outlet port 21c also may be varied.

The first inlet port 40a of the piston-cylinder mechanism may be connected to the outlet port 21b of the control device 10. The second inlet port 50b may be connected to an outlet port 36 of the pressure generator 30. The outlet port 36 may be defined in the body 21 of the control device 10 and may communicate with a hydraulic chamber 35 that is defined between the first piston 31 and the second piston 32 of the pressure generator 30. The first outlet port 50c may be connected to a wheel brake device 16 for a first group of wheels (e.g., front wheels). The second outlet port 50d may be connected to a wheel brake device 17 for a second group of wheels (e.g., rear wheels). The third hydraulic chamber 59 of the piston-cylinder mechanism may be connected to a reservoir 13 of the hydraulic fluid (i.e., brake oil) via the additional valve 260 and the inlet/outlet port 200. The reservoir 13 may be connected to the pump 12a of the pressure source 12 and also may be connected to the inlet/outlet port 21c of the control device 10.

The proportional pressure control valve 20 may provide a function similar to the function of a booster of a known brake control system. Therefore, the pressure of the hydraulic fluid at the outlet port 21b is higher than the pressure of the hydraulic fluid at the outlet port 36 of the pressure generator 30. Thus, when the pressure source 12 and/or the proportional pressure control valve 20 properly operate, the pressure of the hydraulic fluid supplied to the first hydraulic chamber 57 may be higher than the pressure of the hydraulic fluid supplied to the second hydraulic chamber 58. Then, the first piston 52 may move rightward as viewed in FIG. 4 due to the pressure of the hydraulic fluid within the first hydraulic chamber 57, so that the valve 160 may open. The first piston 53 may further move rightward to pressurize the hydraulic fluid within the second hydraulic chamber 58 to have a pressure that is equal to the pressure of the hydraulic fluid within the first hydraulic chamber 57. The pressurized fluid within the second hydraulic chamber 58 may then be delivered to the wheel brake device 16 for the first group of wheels. At the same time, due to increase in pressure of the hydraulic fluid within the second hydraulic chamber 58, the second piston 53 may move rightward to close the valve 260. As the second piston 53 moves further rightward, the hydraulic fluid within the third hydraulic chamber 59 may be pressurized to have a pressure that is equal to the pressure of the hydraulic fluid within the second hydraulic chamber 58. The pressurized fluid within the third hydraulic chamber 58 may then be delivered to the wheel brake device 17 for the second group of wheels.

In case that the pressure source 12 and/or the proportional pressure control valve 20 of the control device 10 may not properly operate due to any trouble, the first piston 52 may not move to close the valve 160. Therefore, the valve 160 may be held to be open. Therefore, the pressurized hydraulic fluid may be supplied from the pressure generator 30 to the second hydraulic chamber 58 via the valve 160. Thus, the pressure of the hydraulic fluid that is supplied into the second hydraulic chamber 58 may become higher than the pressure of the hydraulic fluid that is supplied into the first hydraulic chamber 57. As described in connection with the second representative piston-cylinder mechanism, in this occasion, the second hydraulic chamber 58 may be pressurized at first. The pressurized hydraulic fluid may then be delivered from the second hydraulic chamber 58 to the wheel brake device 16 for the first group of wheels. At the same time, the pressurized hydraulic fluid within the second hydraulic chamber 58 may urge the second piston 53 to move rightward, so that the valve 260 may be closed. After the valve 260 has been closed, the second piston 53 may further move rightward to pressurize the hydraulic fluid within the third hydraulic chamber 59 to the pressure that is equal to the pressure of the hydraulic fluid within the second hydraulic chamber 58. Then, the pressurized hydraulic fluid within the third hydraulic chamber 59 may be delivered to the wheel brake device 17 for the second group of wheels via the second outlet port 50d.

Preferably, the proportional pressure control valve 20 of the control device 10 may include a solenoid 25 and a permanent magnet 26. The solenoid 25 may have a coil 25a, to which an electrical power is supplied to excite the solenoid 25. When a current is applied in one direction to the coil 25a, the excited solenoid 25 may magnetically attract the valve spool 22 in the left direction as viewed in FIG. 4 against the biasing force of the return spring 23. On the other hand, when a current flows through the coil 25a in an opposite direction, the permanent magnet 26 may apply a repelling force against the valve spool 22. Thus, the proportional pressure control valve 20 may be controlled independently of the intention of an operator (e.g., a driver of a vehicle) in addition to the control based on the operation of the brake pedal 14.

As discussed in connection with the first representative piston-cylinder mechanism, the external devices (the brake devices 16 and 17) may be operated automatically and selectively by the pressurized fluid from one of the hydraulic fluid supply devices (the proportional pressure control valves 20 and 30) or the pressurized fluid that has a pressure equal to the pressure of one of the hydraulic fluid supply devices. The pressure of one of the hydraulic fluid supply devices in question is higher than the pressure of the pressurized fluid of the other of the hydraulic fluid supply devices. Therefore, it is possible to provide a fail safe measure without increasing the size of the vehicle brake system or the pressure control unit and without increasing the manufacturing costs.

In addition, according to the representative vehicle brake system, the braking operation can be reliably performed with a sufficient braking force even when the control device 10 may not properly operate. Therefore, the control of a braking pressure may be facilitated without causing a kickback phenomenon against the brake pedal 15.

Figure 4:
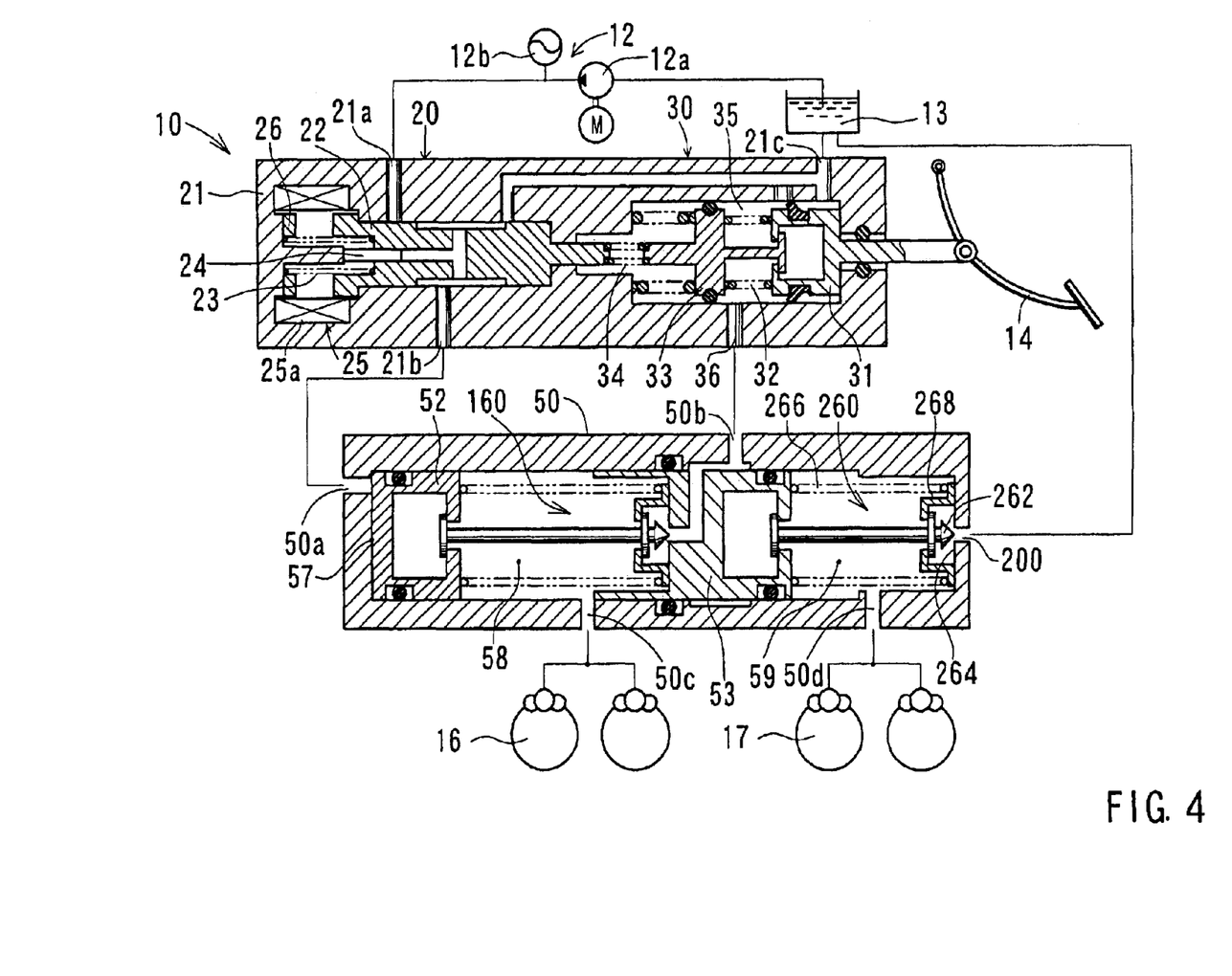
FIG. 4 is a schematic sectional view of a representative pressure control unit for use with a vehicle braking system and incorporating a fourth representative piston-cylinder mechanism.

Naturally, the representative vehicle brake system may be modified by replacing the piston-cylinder mechanism shown in FIG. 4 with the first representative piston-cylinder mechanism shown in FIG. 1 or the third representative piston-cylinder mechanism shown in FIG. 3.

What is claimed is:

1. A piston-cylinder mechanism comprising:
   a cylinder having a longitudinal axis and defining a cylindrical bore;
   at least two pistons disposed within the cylindrical bore, so that at least three pressure chambers including a first pressure chamber, a second pressure chamber and a third pressure chamber are defined within the cylindrical bore along the longitudinal axis of the cylinder, wherein the first pressure chamber and one of the second and third pressure chambers individually receive a supply of a pressurized fluid, and the pressurized fluid is delivered individually from the second pressure chamber and from the third pressure chamber to respective external devices, and
   a valve disposed between at least one of the second pressure chamber and the third pressure chamber and the corresponding external device, wherein the valve is operable to open and close when the at least one of the second pressure chamber and the third pressure chamber is expanded and contracted, respectively, due to the movement of the pistons.

2. A piston-cylinder mechanism as in claim 1, wherein:
the pistons comprise a first piston and a second piston;
the cylindrical bore has a first end surface and a second end surface that oppose to each other,
the first pressure chamber is defined between the first end surface of the cylinder bore and the first piston,
the second pressure chamber is defined between the first piston and the second piston,
the third pressure chamber is defined between the second piston and the second end surface of the cylinder bore,
the first pressure chamber and one of the second pressure chamber and the third pressure chamber communicate with respective pressurized fluid supply devices,
the second pressure chamber and the third pressure chamber communicate with respective external devices, and
the valve is disposed between at least one of the second pressure chamber and the third pressure chamber and the corresponding pressurized fluid supply device.

3. A piston-cylinder mechanism as in claim 1, wherein the first piston has a pressure receiving area that is greater than a pressure receiving area of the second piston.

4. A piston-cylinder mechanism comprising:
a cylinder having a longitudinal axis and defining a cylindrical bore;
at least two pistons disposed within the cylindrical bore, so that at least three pressure chambers including a first pressure chamber, a second pressure chamber and a third pressure chamber are defined within the cylindrical bore along the longitudinal axis of the cylinder, wherein the first pressure chamber and one of the second and third pressure chambers individually receive a supply of a pressurized fluid, and the pressurized fluid is delivered individually from the second pressure chamber and from the third pressure chamber to respective external devices, and
a valve disposed between at least one of the second pressure chamber and the third pressure chamber and the corresponding external device, wherein the valve includes a valve member and a biasing member, and the valve member is movable between an open position and a close position for permitting and preventing the communication between at least one of the second pressure chamber and the third pressure chamber and the corresponding pressurized fluid supply device, respectively, and the biasing member biases the valve member in a direction toward the open position.

5. A piston-cylinder mechanism as in claim 4, wherein the valve member moves from the open position to the close position as one of the second pressure chamber and the third pressure chamber is contracted.

6. A piston-cylinder mechanism as in claim 2, wherein the first pressure chamber and the third pressure chamber communicate with their respective pressurized fluid supply devices, the second pressure chamber and the third pressure chamber communicate with their respective external devices, and the valve is arranged and constructed to permit and prevent the communication between the third pressure chamber and the corresponding pressurized fluid supply device.

7. A piston-cylinder mechanism as in claim 6, wherein the valve is disposed within the third pressure chamber.

8. A piston-cylinder mechanism as in claim 2, wherein the first pressure chamber and the second pressure chamber communicate with their respective pressurized fluid supply devices, the second pressure chamber and the third pressure chamber communicate with their respective external devices, and the valve is arranged and constructed to permit and prevent the communication between the second chamber and the corresponding pressurized fluid supply device.

9. A piston-cylinder mechanism as in claim 8, wherein the valve is disposed within the second pressure chamber.

10. A piston-cylinder mechanism as in claim 8, wherein the second pressure chamber communicates with the corresponding pressurized fluid supply device via a communication channel defined in the second piston.

11. A piston-cylinder mechanism comprising:
a cylinder having a longitudinal axis and defining a cylindrical bore that includes a first end and a second end in the longitudinal direction;
a plurality of pistons disposed within the cylindrical bore so as to define a plurality of pressure chambers between the first end and the second end of the cylindrical bore, wherein at least two of the pressure chambers communicating with their respective sources of pressurized fluid; and
a valve for preventing and permitting communication between at least one of the pressure chambers and the corresponding source of pressurized fluid.

12. A piston-cylinder mechanism as in claim 11, further including:
a plurality of inlet ports defined in the cylinder and communicating with their corresponding pressure chambers and sources of pressurized fluid, and
a plurality of outlet ports defined in the cylinder and communication with their corresponding pressure chambers and external devices that are operable by the pressurized fluid.

13. A pressure control unit comprising a piston-cylinder mechanism as in claim 1, and a first pressure generator and a second pressure generators that serve as the pressurized fluid supply devices, wherein the first pressure generators communicates with the first pressure chamber and the second pressure generators communicates with the one of the second pressure chamber and the third pressure chamber via the valve.

14. A pressure control unit comprising a piston-cylinder mechanism as in claims 1, a first wheel brake and a second wheel brake that serve as the external devices, and a first hydraulic pressure generator and a second hydraulic pressure generator that serve as the pressurized fluid supply devices, wherein:
the first wheel brake is operable to apply a braking force to a first group of vehicle wheels, the second wheel brake is operable to apply a braking force to a second group of vehicle wheels, the first hydraulic pressure generator and the second hydraulic pressure generator are operable to generate different hydraulic pressures from each other,
the first wheel brake is actuated by the pressure within the second pressure chamber, the second wheel brake is actuated by the pressure within the third pressure chamber, and
the first hydraulic pressure generator is coupled to the first pressure chamber, and the second hydraulic pressure generator is coupled to the one of the second and third pressure chambers via the valve.

15. A pressure control unit as in claim 14, wherein the second hydraulic pressure generator is coupled to a brake operation device, so that the second hydraulic pressure generator generates a hydraulic pressure in response to an operation force applied to the brake operation device, and the first hydraulic pressure generator is coupled to the second hydraulic pressure generator and is operable to generate a hydraulic pressure that is proportional to the hydraulic pressure generated by the second hydraulic pressure generator.

16. An apparatus comprising:

a cylinder;

a plurality of pistons disposed within the cylinder and defining a plurality of pressure chambers, wherein each piston moves in response to difference in pressure between the pressure chambers on both sides of each piston;

a plurality of individual sources of pressurized fluid arranged and constructed to supply a pressurized fluid to the corresponding pressure chambers of the cylinder;

a plurality of individual external devices arranged and constructed to receive the supply of the pressurized fluid from the corresponding pressure chambers of the cylinder, wherein at least one of the pressure chambers communicating with both the corresponding source of pressurized fluid and the corresponding external device; and a valve associated with the pressure chamber that communicates with both the corresponding external device and the corresponding source of pressurized fluid, wherein the valve opens and closes to permit and prevent communication between the pressure chamber and the corresponding source of pressurized fluid in response to the relative movement of the pistons that define the pressure chamber, with which the valve is associated.

17. An apparatus as in claim 16, wherein the pressure chambers comprise a first pressure chamber, a second pressure chamber and a third pressure chamber, the first pressure chamber communicates only with the corresponding source of pressurized fluid, the second pressure chamber communicates only with the corresponding external device and the third chamber communicates with both the corresponding source of pressurized fluid and the corresponding external device.

18. An apparatus as in claim 16, wherein the sources of pressurized fluid comprise pressure generators that are operable to supply the pressurized fluid at different pressure from each other.

19. An apparatus as in claim 16, wherein the external devices comprise wheel brake devices of a vehicle.

* * * * *